(12) United States Patent
Gerstenslager et al.

(10) Patent No.: US 7,731,300 B2
(45) Date of Patent: Jun. 8, 2010

(54) HUBCAP FOR HEAVY-DUTY VEHICLES

(75) Inventors: Gary E. Gerstenslager, Canton, OH (US); Jay D. White, Massillon, OH (US); Jeff Morris, Stow, OH (US); Donald R. Hester, East Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 188 days.

(21) Appl. No.: 11/941,597

(22) Filed: Nov. 16, 2007

(65) Prior Publication Data

US 2008/0061623 A1 Mar. 13, 2008

Related U.S. Application Data

(63) Continuation-in-part of application No. 11/494,070, filed on Jul. 27, 2006, now abandoned.

(60) Provisional application No. 60/713,934, filed on Sep. 2, 2005.

(51) Int. Cl.
*B60B 27/00* (2006.01)
(52) U.S. Cl. .................................. 301/108.1; 301/108.4
(58) Field of Classification Search .............. 301/37.26, 301/37.27, 108.1, 108.2, 108.3, 108.4, 37.25, 301/37.38, 37.109, 108.5
See application file for complete search history.

(56) References Cited

U.S. PATENT DOCUMENTS

| | | | | |
|---|---|---|---|---|
| 678,253 | A * | 7/1901 | Hayden | 301/108.1 |
| 739,830 | A * | 9/1903 | Charron | 384/376 |
| 1,155,582 | A * | 10/1915 | Kelly | 301/35.58 |
| 1,319,683 | A * | 10/1919 | Ash | 301/108.5 |
| 1,357,010 | A * | 10/1920 | Timmons | 301/108.1 |
| D62,163 | S * | 4/1923 | Bourgon | D12/212 |
| 1,474,632 | A * | 11/1923 | House, Jr. | 301/63.109 |
| 2,543,427 | A * | 2/1951 | Warne | 141/381 |
| 2,770,260 | A * | 11/1956 | Henderson | 138/89 |
| 4,818,032 | A * | 4/1989 | Thomas | 301/37.21 |
| 5,020,861 | A * | 6/1991 | Gorges | 301/108.1 |
| 5,024,488 | A * | 6/1991 | Lindhuber et al. | 301/108.4 |
| 5,303,800 | A * | 4/1994 | Persson | 184/5.1 |
| 5,586,632 | A * | 12/1996 | Bigley et al. | 192/69.41 |
| 5,752,746 | A * | 5/1998 | Perry | 301/108.1 |

(Continued)

*Primary Examiner*—Russell D Stormer
(74) *Attorney, Agent, or Firm*—Krugliak, Wilkins, Griffiths & Dougherty Co., L.P.A.; David P. Dureska; Edward T. Kennedy

(57) ABSTRACT

A hubcap for a wheel end assembly of a heavy-duty vehicle seals an outboard end of the wheel end assembly. The wheel end assembly includes a wheel hub formed with a cavity that contains lubricant, and the hubcap positively engages and mounts on the outboard end of the wheel hub to prevent the escape of lubricant and the ingress of contaminants. The integrally-formed hubcap includes a generally cylindrical sidewall and an outboard wall that extends generally perpendicular to the sidewall. A lip extends inboardly from and a shoulder extends radially outwardly from an inboard end of the sidewall, and the lip and shoulder cooperate to positively mechanically engage the outboard end of the wheel hub. An O-ring is disposed between the lip and the wheel hub to provide a seal. The hubcap also is adapted to accommodate components of a tire inflation system and other auxiliary components.

27 Claims, 11 Drawing Sheets

U.S. PATENT DOCUMENTS

| | | | |
|---|---|---|---|
| 5,876,099 A * | 3/1999 | Irgens-Moller et al. | 301/108.4 |
| 6,145,559 A * | 11/2000 | Ingram, II | 152/417 |
| 6,273,519 B1 * | 8/2001 | Tsou | 301/108.2 |
| 6,394,159 B1 * | 5/2002 | Cobb | 152/416 |
| 6,425,427 B1 * | 7/2002 | Stech | 152/417 |
| 6,447,072 B1 * | 9/2002 | Johnson | 301/108.2 |
| 6,971,722 B2 * | 12/2005 | Denton | 301/108.4 |
| 2004/0238093 A1 * | 12/2004 | Nelson et al. | 152/415 |
| 2009/0283190 A1 * | 11/2009 | Padula et al. | 152/417 |

* cited by examiner

HUBCAP FOR HEAVY-DUTY VEHICLES

CROSS-REFERENCE TO RELATED APPLICATIONS

This application is a continuation-in-part of application Ser. No. 11/494,070, filed on Jul. 27, 2006, now abandoned, which claims the benefit of U.S. Provisional Patent Application Ser. No. 60/713,934, filed on Sep. 2, 2005.

BACKGROUND OF THE INVENTION

1. Technical Field

The invention relates to wheel end assemblies, and in particular to wheel end assemblies for heavy-duty vehicles, such as tractor-trailers. More particularly, the invention is directed to a hubcap of a wheel end assembly for a heavy-duty vehicle, which is connected to a wheel hub to seal the outboard end of the assembly, and includes an O-ring to provide improved sealing engagement with the hub, a lip and a shoulder that enable convenient alignment with the hub, an exterior cylindrical cavity that enables easy axial alignment of auxiliary devices, an opening that facilitates the mounting of components of a tire inflation system, and a step that improves impact resistance of the hubcap and the mounting of tire inflation system components.

2. Background Art

For many years, the heavy-duty vehicle industry has utilized wheel end assemblies which typically are mounted on each end of one or more non-drive axles. Each wheel end assembly typically includes a hub rotatably mounted on a bearing assembly that in turn is immovably mounted on the outboard end of the axle, commonly known as an axle spindle. As is well known to those skilled in the art, for normal operation of the wheel end assembly to occur, the bearing assembly and surrounding components must be lubricated with grease or oil. Therefore, the wheel end assembly must be sealed to prevent leakage of the lubricant, and also to prevent contaminants from entering the assembly, both of which could be detrimental to its performance. More specifically, a hubcap is mounted on an outboard end of the wheel hub, and a main seal is rotatably mounted on an inboard end of the hub and the bearing assembly in abutment with the axle spindle, resulting in a closed or sealed wheel end assembly.

While most wheel end assemblies include these general features, the design and arrangement of the hub, bearing assembly, hubcap, main seal, and other components, as well as the axle spindle, vary according to the specific vehicle design and its anticipated uses. For example, hubcaps of the prior art typically include a flat outboard surface, and a gasket that is disposed between a flange formed on the inboard end of the hubcap and the outboard surface of the hub to prevent bearing lubricant from leaking out of the wheel end assembly, and to prevent contaminants from entering the assembly. Such hubcaps, while adequate for some applications, include certain disadvantages.

For example, as mentioned above, the hubcap must provide an effective seal to prevent the bearing lubricant from leaking out of the outboard end of the wheel end assembly, and to prevent water and contaminants from entering the wheel end assembly. In the prior art, a gasket disposed between the hubcap and the outboard surface of the hub typically has been used to provide this seal. However, several potential issues may arise during reassembly after servicing of the wheel end assembly. For example, human error can result in failure to reinstall the gasket since it is a discrete component, and may thereby allow lubricant to leak out of the assembly, or may allow water and contaminants to enter the assembly. The gasket might also be under-tightened and may thus be loose, which could reduce the seal it provides and again potentially allow lubricant to leak out, or possibly allow water and contaminants to enter. The gasket could be over-tightened, which may crush it, again potentially reducing the seal it provides, which may allow lubricant to leak out, or may allow water and contaminants to enter. In addition, the gasket simply may degrade over time, potentially allowing lubricant to leak out of the wheel end assembly or potentially allowing water and contaminants to enter the assembly.

Moreover, the flat outboard surface of prior art hubcaps complicates the retrofit of devices that may be secured to the outboard end of the axle spindle and/or wheel end assembly. For example, a hub odometer is often attached to the hubcap. One type of hub odometer attaches to a prior art hubcap via a bracket, and for attachment uses the same bolts that attach the hubcap to the wheel hub. It is possible, during installation of the hub odometer, to overtighten these bolts in order to secure the bracket, which may crush the prior art gasket and cause it to leak.

Another type of hub odometer does not rely on bolts for attachment, and is secured directly to the hubcap. However, such odometers typically are installed on prior art hubcaps that threadably engage the wheel hub and are not intended by the manufacturer to be removed from the wheel hub. The flat outboard surface of the prior art hubcap, however, necessitates removal of the hubcap so that the axial center of the hubcap may be located and a hole drilled for the odometer. Since the seal between the hubcap and the wheel hub must be broken, lubricant may be lost and/or components may become contaminated.

In addition, devices used to measure axle alignment, such as a trammel bar or a wheel extender, typically are secured to the outboard end of the axle spindle and/or wheel end assembly and must be aligned with the axial centerline of the wheel end assembly near the outboard end of the axle spindle. The design of prior art hubcaps causes the users of some trammel bars and wheel extenders to remove the hubcap to align the trammel bar or the wheel extender, which could also result in undesirable loss and/or contamination of lubricant.

To overcome the disadvantage of a lack of an axial alignment point on prior art hubcaps having a flat outboard surface, other prior art hubcaps have been developed that include a dimple formed on the outboard surface of the hubcap. However, such hubcaps typically bolt onto the wheel hub, and the bolt holes of the hubcaps include bolt holes that are larger than the bolts, which can allow the hubcap to shift as it is installed. Thus, the dimple of such a prior art hubcap may not always be aligned with the axial centerline of the axle spindle and wheel end assembly.

Another disadvantage of prior art hubcaps is the potential for the hubcap to be subject to damage from impacts. More particularly, when an axle with a pair of wheel end assemblies is shipped from a manufacturer, the bearing assembly and hub of each wheel end assembly typically are installed on each respective axle spindle, without wheels or tires. The hubcap usually is assembled onto the hub, and without wheels in place, the hubcap extends outboardly past the remainder of the wheel end assembly. As the axle with the wheel end assemblies is prepared for shipment, loaded for shipment, and unloaded from shipment, the hubcaps thus are particularly susceptible to contact with other items and may undergo impacts, which is undesirable.

Prior art hubcaps required a significant number of bolts, such as six (6) or more, to enable the hubcap to maintain a sealed connection with the hub throughout such impacts. In addition, the straight-walled design of prior art hubcaps sometimes developed a crack under such impacts, requiring replacement of the hubcap. Moreover, the relatively large outer diameter of prior art hubcaps increased the possibility of contact with another object during transport, thereby increasing the potential that an impact might occur.

In addition, prior art hubcaps that are used with tire inflation systems include disadvantages associated with the mounting of components of the tire inflation systems. More particularly, tire inflation systems necessitate the mounting of additional components inside and/or proximate the hubcap, such as a rotary union assembly and air tubes. In order to mount such tire inflation system components, the hubcap typically must be removed from the wheel hub, but prior art hubcaps are designed to be sealed to the wheel hub and not removed, thereby undesirably making the component mounting process more complex and potentially problematic. Also, the relatively large outer diameter of prior art hubcaps often causes air tubes of a tire inflation system mounted on the hubcap to extend a significant distance in a radially outward direction, which may then cause a wheel to contact the air tubes when the wheel is removed from the hub for tire repair or replacement. Such contact with the air tubes may lead to damage of the tubes, or the need to remove the air tubes when the wheel is removed.

Moreover, prior art hubcaps lack the ability to accommodate the mounting of multiple separate components, which is inconvenient for some heavy-duty vehicle users. For example, components such as the rotary union assembly, which is mounted in an outboard end of the axle spindle, prevents centering of a trammel bar in the end of the axle spindle in certain prior art hubcaps. As a result, a heavy-duty vehicle user would have to remove the rotary union assembly to obtain a centering hole for the trammel bar, or would have to refrain from utilizing the trammel bar altogether. Therefore, such prior art hubcaps undesirably limit the components that may be installed or used on the axle spindle and the wheel end assembly.

These disadvantages of prior art hubcaps make it desirable to develop a hubcap for a heavy-duty wheel end assembly that provides a more effective seal, readily and accurately accommodates an odometer, a trammel bar or a wheel extender without disturbing the sealing connection between the hubcap and the wheel hub, resists damage from impacts, accommodates a protective plug, facilitates the mounting of certain tire inflation system components either alone or in combination with other components such as odometers, trammel bars, wheel extenders, and the like, and enables tire inflation system components to be mounted in a manner that allows a wheel to be easily removed without damage to the system components. The present invention satisfies these needs.

SUMMARY OF THE INVENTION

One objective of the present invention is to provide a hubcap for a heavy-duty wheel end assembly that includes an improved seal.

Another objective of the present invention is to provide a hubcap for a heavy-duty wheel end assembly that readily and accurately accommodates an odometer, a trammel bar, a wheel extender, and a protective plug without disturbing the sealing connection between the hubcap and the wheel hub.

Yet another objective of the present invention is to provide a hubcap for a heavy-duty wheel end assembly that resists damage from impacts.

Still another objective of the present invention is to provide a hubcap for a heavy-duty wheel end assembly that facilitates the mounting of certain tire inflation system components either alone or in combination with other components such as odometers, trammel bars, wheel extenders, and the like.

Yet another objective of the present invention is to provide a hubcap for a heavy-duty wheel end assembly that enables tire inflation system components to be mounted in a manner which allows a wheel to be removed without damaging the tire inflation system components.

These objectives and others are obtained by the hubcap for a heavy-duty wheel end assembly of the present invention. The wheel end assembly includes a wheel hub formed with a cavity for containing lubricant, and an outboard end. The hubcap includes a generally cylindrical sidewall that extends generally parallel to an axial centerline of the wheel end assembly when the hubcap is mounted on the wheel hub. An outboard wall extends generally perpendicular to the sidewall. A lip extends inboardly from the sidewall, and a shoulder extends generally radially outwardly from the sidewall. Seal means is generally disposed between the lip and the wheel hub, and the lip and the shoulder cooperate to positively engage the wheel hub outboard end, and the seal means seals said engagement.

BRIEF DESCRIPTION OF THE DRAWINGS

The preferred embodiments of the present invention, illustrative of the best modes in which applicant has contemplated applying the principles, are set forth in the following description, are shown in the drawings, and are particularly and distinctly pointed out and set forth in the appended claims.

DESCRIPTION OF THE PREFERRED EMBODIMENTS

Figure 1:
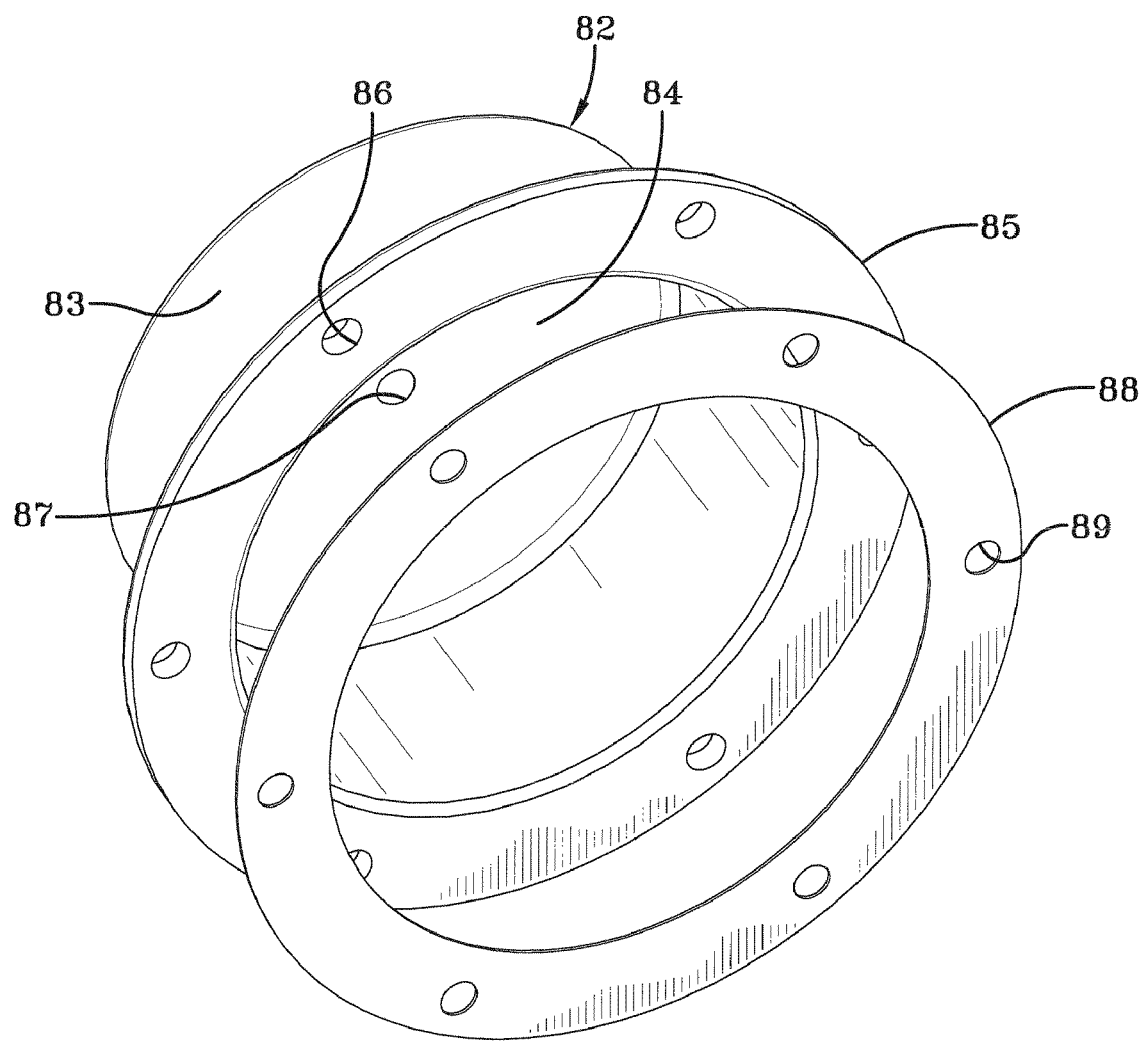
FIG. 1 is an exploded perspective view of a prior art hubcap and a gasket used with the hubcap.

In order to better understand the hubcap of the present invention, an exemplary prior art hubcap and gasket are shown in FIG. 1 and now will be described. Prior art hubcap 82 includes a cylindrical sidewall 83, and an outboard wall 84 integrally formed with the outboard end of the side wall. A dimple 87 is formed generally in the center of outboard wall 84. A radially-extending flange 85 is formed on the inboard end of side wall 83, and is formed with six (6) equally circumferentially-spaced bolt openings 86 to enable bolts (not shown) to secure hubcap 82 to the outboard end of a wheel hub (not shown). A gasket 88 is a discrete component formed with six (6) equally circumferentially-spaced openings 89, for aligning with openings 86 formed in hubcap mounting flange 85 to enable the gasket to seat between hubcap 82 and the outboard surface of the wheel hub for sealing the connection between the hubcap and the hub when the hubcap is tightened down against the hub.

The design of prior art hubcap 82 includes certain disadvantages, as described above. To summarize, the use of gasket 88 to provide the seal between the hubcap and the outboard surface of the hub may result in the failure of a technician to reinstall the gasket 88 after servicing of the wheel end assembly (not shown), thereby possibly allowing lubricant to leak out of the assembly, or allowing water and contaminants to enter the assembly. Gasket 88 also is susceptible to under-tightening, over-tightening, and degradation, all of which potentially allow lubricant to leak out of the wheel end assembly or allow water and contaminants to enter the assembly.

In addition, the design of hubcap 82 complicates the retrofit of devices that may be secured to the outboard end of the axle spindle and/or wheel end assembly such as a hub odometer, trammel bar or wheel extender. These devices typically must be installed in alignment with the axial center of the axle spindle to function properly. However, while outboard wall 84 of hubcap 82 is formed with dimple 87 to enable a technician to locate the axial center of the hubcap to install such devices, the dimple may not be aligned with the axial center of the axle spindle. More particularly, hubcap 82 is aligned with the wheel hub and the axle spindle via bolts that pass through bolt openings 86 formed in the hubcap mounting flange 85. Since openings 86 are formed larger than the threaded body of each respective bolt to allow the bolts to easily pass through the openings, hubcap 82 may shift as it is installed, and dimple 87 may thus not be aligned with the axial center of the axle spindle.

Moreover, prior art hubcap 82 includes generally straight cylindrical side wall 83, which results in a generally large outer diameter for the hubcap, which increases the potential for the hubcap to contact an object during shipping, and the straight walls may not provide optimum strength to resist an impact from such contact. In addition, to resist unseating of hubcap 82 from the wheel hub in the event of such impacts, which may damage or destroy the sealed connection between the hubcap and the wheel hub, the prior art hubcap requires six (6) bolts, which increases the weight and expense associated with the hubcap.

Furthermore, prior art hubcap 82 includes disadvantages associated with the mounting of components of tire inflation systems (not shown). For example, with gasket 88, hubcap 82 is designed to be sealed to the wheel hub and not removed, but it is often necessary to remove the hubcap to install a rotary union and/or air tubes of a tire inflation system. Also, the relatively large outer diameter of side wall 83 of hubcap 82 causes air tubes of a tire inflation system to extend a significant distance radially outwardly from the hubcap, which may then cause a wheel to contact the air tubes when the wheel is removed from the hub for tire repair or replacement.

In addition, it may be difficult to mount multiple separate components or devices on prior art hubcap 82. For example, when a rotary union assembly of a tire inflation system is present in the axle spindle and it is desired to use a trammel bar and not rely on hubcap dimple 87 as the axle center, it is necessary to form an opening in outboard wall 84 of hubcap 82 to enable the trammel bar to pass through the hubcap, or to remove the hubcap. However, since hubcap 82 is not prearranged to readily accommodate both the rotary union and the trammel bar, it may be necessary to remove the rotary union to make room to center the trammel bar in the outboard end of the axle spindle.

Such disadvantages of prior art hubcap 82 make it desirable to develop a hubcap for a heavy-duty wheel end assembly that provides a more effective seal, readily and accurately accommodates auxiliary devices such as an odometer, trammel bar, wheel extender and components of a tire inflation system, facilitates convenient mounting or utilization of multiple separate auxiliary components simultaneously, resists damage from impacts, and enables tire inflation system components to be mounted in a manner that allows a wheel to be easily removed. The present invention satisfies these needs, as will be described in detail below.

Figure 2:
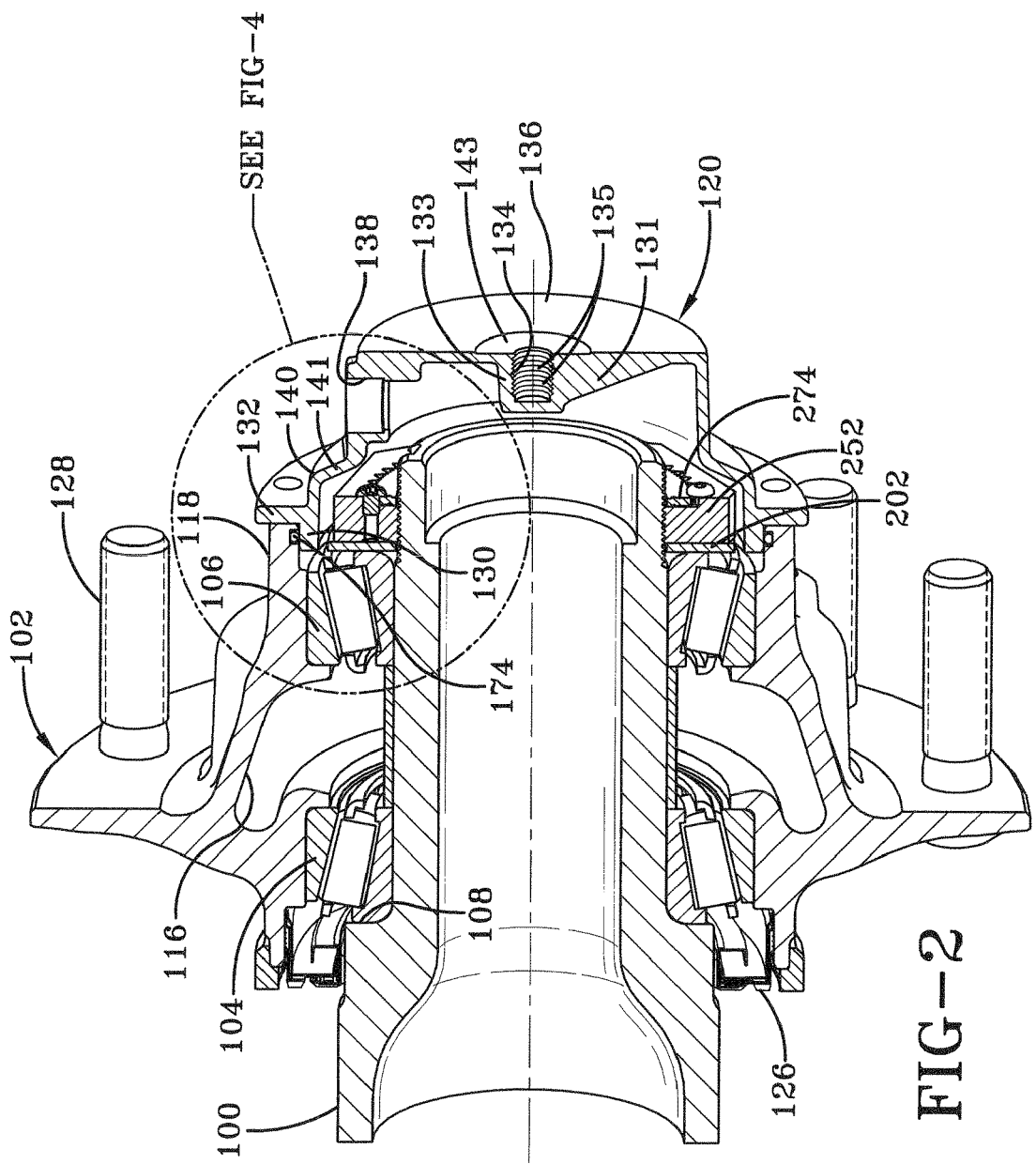
FIG. 2 is a fragmentary cross-sectional perspective view of a portion of an axle spindle and a wheel end assembly, including a first embodiment of the hubcap of the present invention.

Turning now to FIG. 2, a first embodiment of a hubcap of the present invention is shown and is indicated generally at 120. In order to better understand hubcap 120 of the present invention, the environment in which it operates now will be described. An axle depends from and extends transversely across the trailer of a heavy-duty tractor-trailer (not shown). More specifically, and as is known in the art, the axle includes a central tube having a pair of ends (not shown) and a pair of axle spindles 100, with each one of the axle spindles being integrally connected by any suitable means, such as welding, to a respective one of the ends of the central tube, so that the axle is comprised of the central tube and a pair of axle spindles. A typical heavy-duty tractor-trailer includes one or more non-drive axles suspended from the trailer, with each of the axles having a wheel end assembly 102 mounted on each end of the axle. For the sake of clarity, only one axle end and wheel end assembly 102 will be described herein. Axle spindle and wheel end assembly 100, 102 are more fully described in a separate application being filed concurrently herewith by the same assignee, Hendrickson USA, L.L.C.

Wheel end assembly 102 includes a bearing assembly having an inboard bearing 104 and an outboard bearing 106 that are the same diameter and are immovably mounted on the outboard end of axle spindle 100. More particularly, inboard bearing 104 is mounted on the outer diameter of axle spindle 100 with its inboard surface in abutment with a shoulder 108 formed in the axle spindle. A cavity 116 is formed between inboard and outboard bearings 104, 106, and a short, straight bearing spacer (not shown) optionally is disposed between the bearings in the cavity to maintain spacing between the bearings. An exemplary bearing spacer, if one is used, is more fully described in a separate application being filed by the same assignee, Hendrickson USA, L.L.C. A nut 252 threadably engages the outboard end of axle spindle 100, and via an outer washer 274 and an optional inner washer 202, secures bearings 104, 106 and any bearing spacer in place. Nut 252 is more fully described in a separate application being filed concurrently herewith by the same assignee, Hendrickson USA, L.L.C. A wheel hub 118 is rotatably mounted on inboard and outboard bearings 104, 106 in a manner well known to those skilled in the art.

Figure 3:
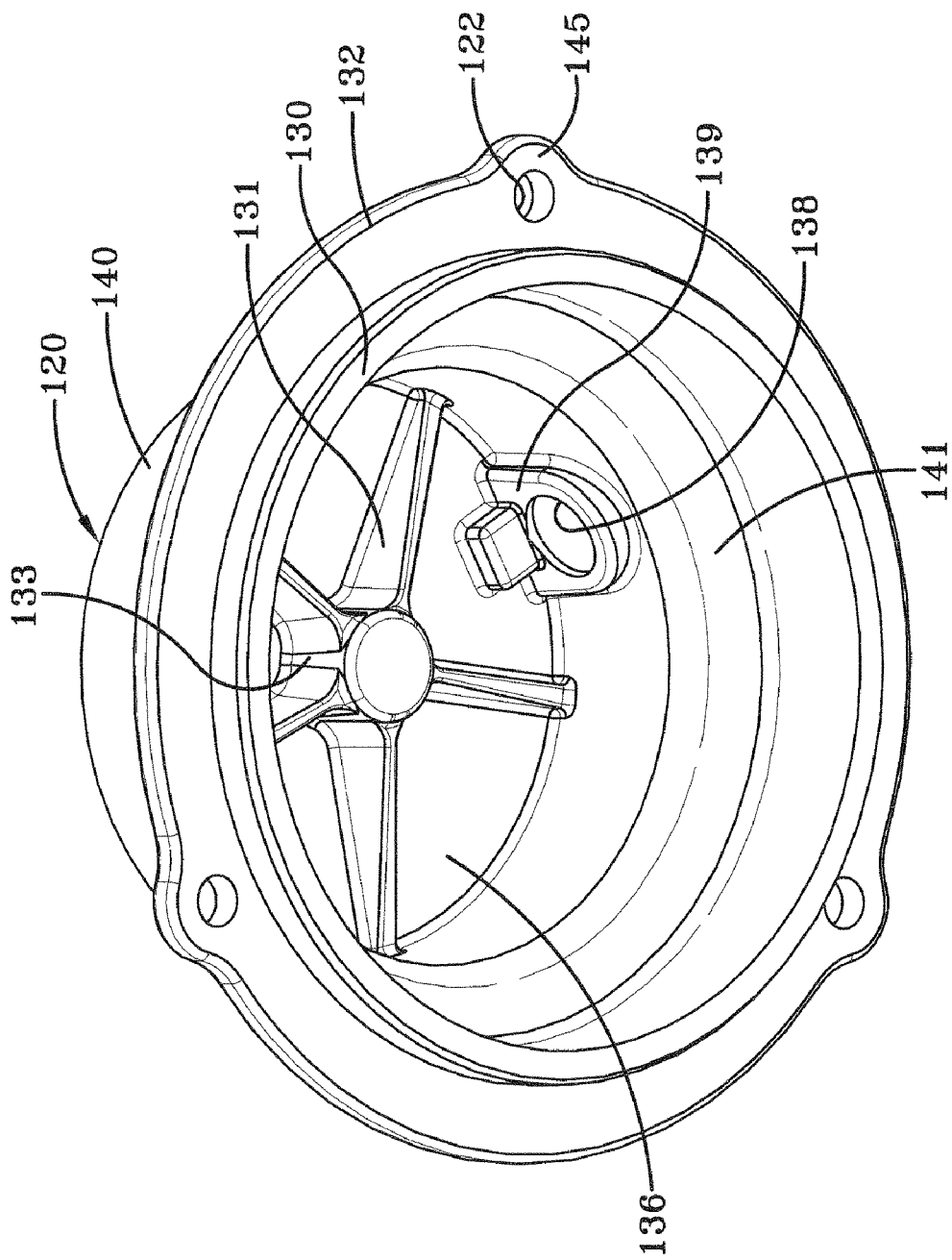
FIG. 3 is an enlarged perspective view of the interior portion of the hubcap shown in FIG. 2.

With reference now to FIGS. 2 and 3, First embodiment hubcap 120 of the present invention is mounted on the outboard end of hub 118 by a plurality of bolts (not shown) that each pass through a respective one of a plurality of openings 122 formed in the hubcap, and threadably engage a respective one of a plurality of aligned threaded openings (not shown) formed in the hub. In this manner, hubcap 120 closes the outboard end of wheel end assembly 102. A main continuous seal 126 is rotatably mounted on the inboard end of wheel end assembly 102 and closes the inboard end of the assembly. More particularly, seal 126 is mounted on wheel end assembly 102 in a suitable manner and radially bridges hub 118 and axle spindle 100 to seal cavity 116. In order to maintain proper lubrication and operation of inboard and outboard bearings 104, 106, a suitable amount of lubricant (not shown) is introduced into cavity 116. A plurality of interference-fit studs 128 are used to mount a brake drum 244 (FIG. 7), wheels 240, 242 and a tire (not shown) on wheel end assembly 102.

First embodiment hubcap 120 is mounted directly on the outboard end of hub 118. With continuing reference to FIGS. 2 and 3, hubcap 120 preferably is integrally formed and includes a generally axially-extending cylindrical sidewall 140. Sidewall 140 is formed with a step 141, so that the portion of the sidewall inboardly of the step is of a larger diameter than the portion of the sidewall outboardly of the step, the advantages of which will be described below. An inboardly-extending lip 130 is formed inboardly of sidewall 140 and is received in the inner diameter of the outboard end of hub 118 when the hubcap is mounted on the hub. A shoulder 132 extends radially outwardly from sidewall 140 adjacent to lip 130, and thereby abuts the outboard surface of the end of wheel hub 118 when the hubcap is mounted on the hub. In this manner, lip 130 and shoulder 132 cooperate to positively mechanically engage hub 118 and thus align hubcap 120 about the axial centerline of the hub, as will be further described below.

Hubcap 120 also includes an outboard wall 136, which extends generally perpendicular to sidewall 140. To secure hubcap 120 to hub 118, shoulder 132 is formed with openings 122 that receive bolts (not shown) for threadably engaging aligned openings (not shown) formed in the hub. Preferably, three (3) openings 122 are formed in shoulder 132, although more openings may be formed without affecting the overall concept or operation of the invention, such as up to six (6) or eight (8) openings. Also, the area of shoulder 132 surrounding each respective opening 122 preferably is formed with a radially-extending protuberance 145, which provides a suitable area for the heads of the bolts that secure hubcap 120 to hub 118 to firmly seat.

As best shown in FIG. 2, outboard wall 136 of hubcap 120 is formed with a recessed area 143 which facilitates the attachment of auxiliary devices, as will be described in greater detail below. In the center of recessed area 143, a cylindrical structure 133 extends inboardly from the inboard surface of outboard wall 136 in alignment with the axial centerline of axle spindle 100. An opening 134 is formed in recessed area 143 and continues into cylindrical structure 133 for receiving an auxiliary device. Cylindrical structure 133 preferably is formed with threads 135 for threadably receiving the auxiliary device, and is closed at its inboard end. As shown in FIG. 3, to provide support for cylindrical structure 133 when an auxiliary device is connected to hubcap 120, a plurality of circumferentially-spaced ribs 131 extend radially outwardly from the outer surface of the cylindrical structure to the inner surface of sidewall 140.

Figure 7:
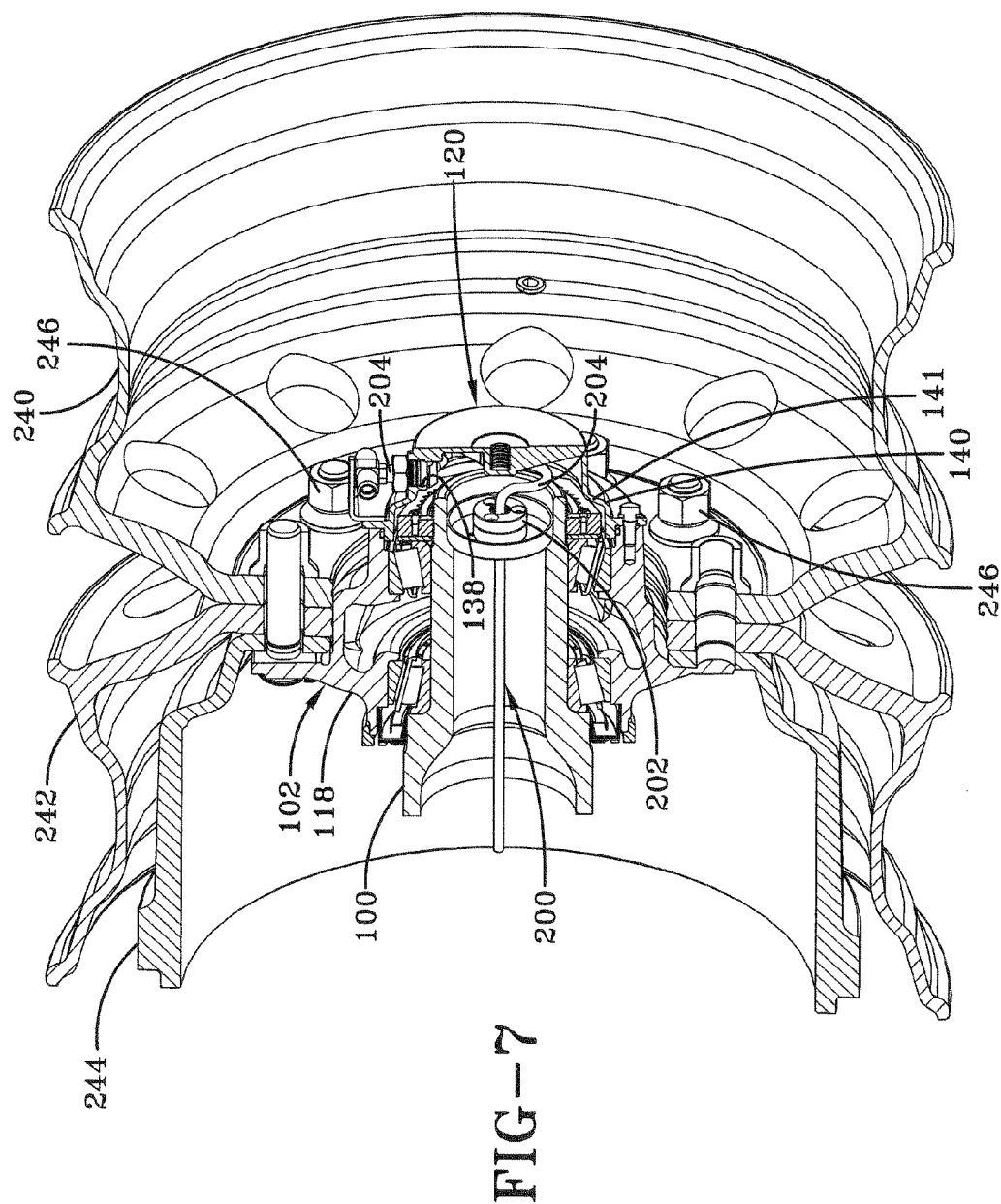
FIG. 7 is a view similar to FIG. 2, but showing certain components of a tire inflation system mounted on the axle spindle, the wheel end assembly, and the first embodiment hubcap of the present invention, and a brake drum and wheels mounted on the hub of the wheel end assembly.

As will be described in greater detail below, and as shown in FIGS. 2 and 3, sidewall 140 of hubcap 120 is formed with an opening 138 which enables convenient mounting of components of a tire inflation system 200 (FIG. 7). Preferably, sidewall 140 also includes a boss structure 139 to reinforce the area of the sidewall proximate opening 138.

Figure 4:
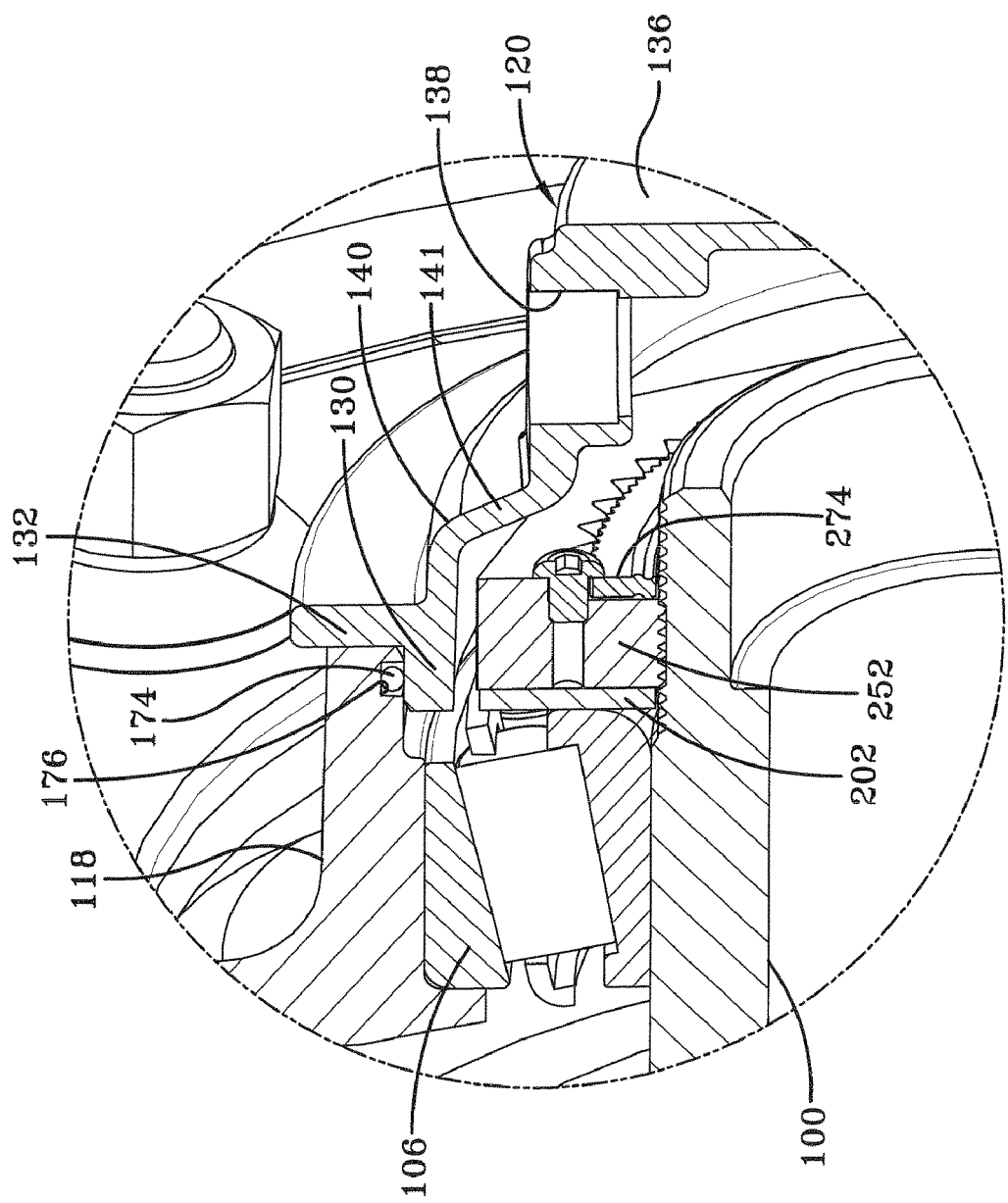
FIG. 4 is a greatly enlarged view of a portion of the axle spindle, wheel end assembly and hubcap shown in the circled area of FIG. 2, and in particular shows the location of an O-ring relative to a hub of the wheel end assembly and the hubcap.

As mentioned above, first embodiment hubcap 120 is partially filled with lubricant for bearings 104, 106 (FIG. 2), and must seal the outboard end of wheel end assembly 102 to prevent undesirable leakage of the lubricant, and to prevent contaminants from entering the wheel end assembly. Rather than use a separate gasket to provide such a seal, as does prior art hubcap 82 (FIG. 1), lip 130 and shoulder 132 of hubcap 120 cooperate to provide firm alignment for an elastomeric O-ring 174. More specifically, as best shown in FIG. 4, O-ring 174 associated with first embodiment hubcap 120 is firmly disposed in a channel 176 formed in an inner surface of hub 118 near the outboard surface of the hub, thereby contacting lip 130 of the hubcap to form a seal. This is different from prior art hubcap 82, which uses a loose gasket 88 (FIG. 1), which must be properly positioned during installation of the hubcap.

In accordance with an important feature of the invention, the use of O-ring 174 in hub channel 176 enables the O-ring and hub 118 to be preassembled, so that there is no separate gasket 88 to insert when hubcap 120 is installed, as with hubcaps of the prior art. The elimination of separate gasket 88 reduces the time and effort for assembly of wheel end 102, and also eliminates the possibility that the gasket might accidentally be omitted during assembly. In addition, not using prior art gasket 88 eliminates potential under or over-tightening of the gasket, both of which can cause the prior art gasket to leak. In contrast, O-ring 174 will still likely form an effective seal even if hubcap 120 is under or over-tightened, since the O-ring is a more effective sealing device than prior art gaskets, and the annular contact provided by the O-ring is very robust and therefore not readily affected by under or over-tightening of the hubcap. Moreover, the use of O-ring 174 reduces the possibility that lubricant may leak from wheel end assembly 102, or that contaminants may enter the assembly, due to a deteriorating prior art gasket.

It also is important to note that the use of O-ring 174 in hub channel 176, rather than on first embodiment hubcap 120, eliminates the need to form a channel in the hubcap to receive the O-ring. This reduces the machining needed for hubcap 120, thereby reducing the time and expense associated with the manufacture of the hubcap.

Returning now to FIG. 2, in accordance with another important feature of the invention, cylindrical structure 133 and opening 134 enable hubcap 120 to readily accommodate an odometer, wheel extender or trammel bar. More particularly, cylindrical structure 133 and opening 134 are formed in outboard wall 136 of hubcap 120 along the axial centerline of the hubcap. Due to the positive mechanical engagement of lip 130 and shoulder 132 with hub 118 in combination with O-ring 174, automatic alignment of hubcap 120 along the axial centerline of the hub results upon mounting the hubcap on the hub. To facilitate the location of opening 134 for easy attachment of a wheel extender, outboard wall 136 of hubcap 120 is formed with a recessed surface 143. Such easy attachment also is facilitated by threads 135 formed in cylindrical structure 133, thereby enabling an odometer or wheel extender having mating threads to conveniently be screwed into the cylindrical structure and thus attached to hubcap 120 in automatic alignment with axle spindle 100. In addition, cylindrical structure provides a convenient aligned structure to receive an end of a trammel bar, thereby enabling easy centering of the trammel bar.

In this manner, hubcap 120 does not have to be removed to accommodate an auxiliary device, eliminating a complex procedure, loss of lubricant, and/or contamination associated with the use of prior art hubcap 82. Moreover, threaded cylindrical structure 133 eliminates the need for drilling hubcap 120 for ready insertion of an odometer, which eliminates the loss of lubricant from wheel end assembly 102 and/or accidental contamination that is associated with removal of prior art hubcap 82.

With reference now to FIGS. 2, 3, and 7, in accordance with yet another important feature of the present invention, sidewall 140 of hubcap 120 is formed with opening 138, which enables the hubcap to accept and mount components of a tire inflation system 200, such as a rotary union assembly 202 and air tubes 204, as shown in FIG. 7. An exemplary tire inflation system 200 is shown and described in U.S. patent application Ser. No. 10/827,040, now U.S. Pat. No. 7,273,082,which is assigned to Hendrickson USA, L.L.C., the assignee of the present invention, and is incorporated herein by reference. The area of sidewall 140 proximate opening 138 is reinforced by boss structure 139, and the opening and boss structure cooperate to provide a stable mounting and alignment area in hubcap 120 for rotary union assembly 202 and other tire inflation system components, such as air tubes 204. Through the use of opening 138 and boss structure 139, rotary union assembly 202 and/or air tubes 204 may be preassembled in hubcap 140, and then brought to wheel end assembly 102 as a single unit, thereby improving the assembly process for the wheel end assembly.

More particularly, boss structure 139 provides a flat surface that acts as a physical reference for an installer for checking the alignment of air tubes 204 before they are tightened and rotary union 202 is attached. In this manner, the assembly of air tubes 204 and rotary union 202 is made easier and more accurate. It should be noted that hubcap 120 may be formed as a die casting without opening 138, which provides the option of machining opening 138 at a later time if tire inflation system 200 is not initially used with the hubcap.

Referring now to FIGS. 2 and 3, in accordance with still another important feature of the present invention, sidewall 140 is formed with a step 141, so that the portion of the sidewall inboardly of the step is of a larger diameter than the portion of the sidewall outboardly of the step. The use of step 141 enables lip 130 and shoulder 132 to be formed with an appropriate diameter to provide proper alignment and engagement with hub 118, as described above, while reducing the diameter of hubcap 120 at its outboard end, which provides multiple advantages.

More particularly, by graduating radially inwardly as it extends axially outboardly, step 141 acts as a circumferential rib that extends about hubcap 120, thereby providing increased hoop strength for the hubcap. This increased hoop strength effectively strengthens sidewall 140 and increases the force distribution between outboard wall 136 and the sidewall. In this manner, step 141 creates a stronger hubcap 120 with improved resistance to impacts and other forces that may damage the hubcap and/or its connection to hub 118. Also, the increased strength of hubcap 120 enables the use of three (3) bolts (not shown) to maintain the sealed connection between the hubcap and hub 118, rather than six (6), as with prior art hubcap 82 (FIG. 1). Such a reduction in the number of bolts used for hubcap 120 desirably reduces the weight and the cost associated with the hubcap, and possibly with mating hub 118 by removing boss structures formed in the hub to receive the bolts. In addition, the reduced outboard diameter of hubcap 120 reduces the area of the hubcap that might contact an object, and thus reduces the chance of an impact.

Moreover, the reduced outboard diameter of hubcap 120 enables components of tire inflation system 200 to be mounted in a manner that prevents damage to the components when a wheel is removed from hub 118. More particularly, as shown in FIG. 7, an outboard wheel 240, an inboard wheel 242, and a brake drum 244 typically are mounted on wheel hub 118 via interference-fit studs 128 and nuts 246. Tires (not shown) are mounted on wheels 240, 242, as known in the art. When it is necessary to repair or replace the tires, one or both wheels 240, 242 are removed by unscrewing nuts 246 and sliding the wheels off of studs 128. When prior art hubcap 82 (FIG. 1) is used, its relatively large outer diameter may cause air tubes 204 mounted thereon to extend radially outwardly past the inner diameter of wheels 240, 242, so that the wheels contact the air tubes when the wheels are removed. As a result, a technician removing wheels 240, 242 has to jog the wheels around air tubes 204 once the wheels are moved off of studs 128, which may damage the air tubes, or has to remove the air tubes before removing the wheels.

Step 141 in sidewall 140 of first embodiment hubcap 120 reduces the outboard diameter of the hubcap. This reduced outboard diameter preferably enables air tubes 204 to be mounted on hubcap 120 radially inwardly of the inner diameter of wheels 240, 242, so that the wheels can pass over the air tubes without contacting them. In this manner, the probability of damage to air tubes 204 of tire inflation system 200 when wheels 240, 242 are removed is reduced by step 141 of hubcap 120. Alternatively, step 141 reduces the outboard diameter of hubcap 120 to an extent that may not provide complete radial clearance between air tubes 204 and wheels 240, 242, but is of a lesser diameter than that of prior art hubcap 82. In this manner, step 141 provides increased clearance for wheels 240, 242 to be moved off of studs 128 and then jogged over air tubes 204 with a reduced potential for damage to the air tubes when compared to the prior art. For example, step 141 may reduce the outboard diameter of hubcap 120 so that the distance from the surface of hubcap 120 opposite air tubes 204 to the radially outwardmost surface of the air tubes is less than the inner diameter or wheel pilot of each wheel 240, 242.

Figure 5:
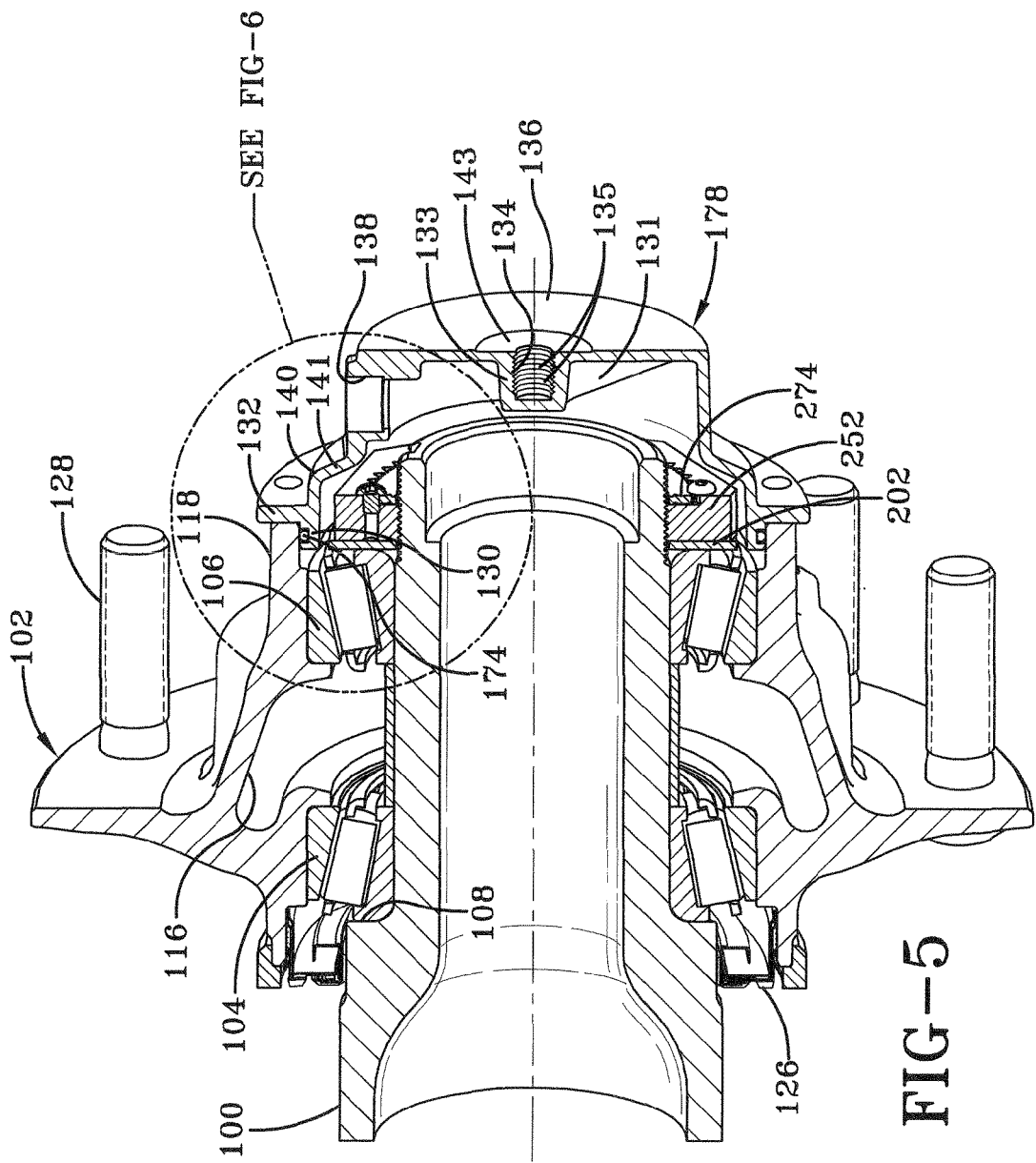
FIG. 5 is a view similar to FIG. 2, but showing a second embodiment of the hubcap of the present invention.
Figure 6:
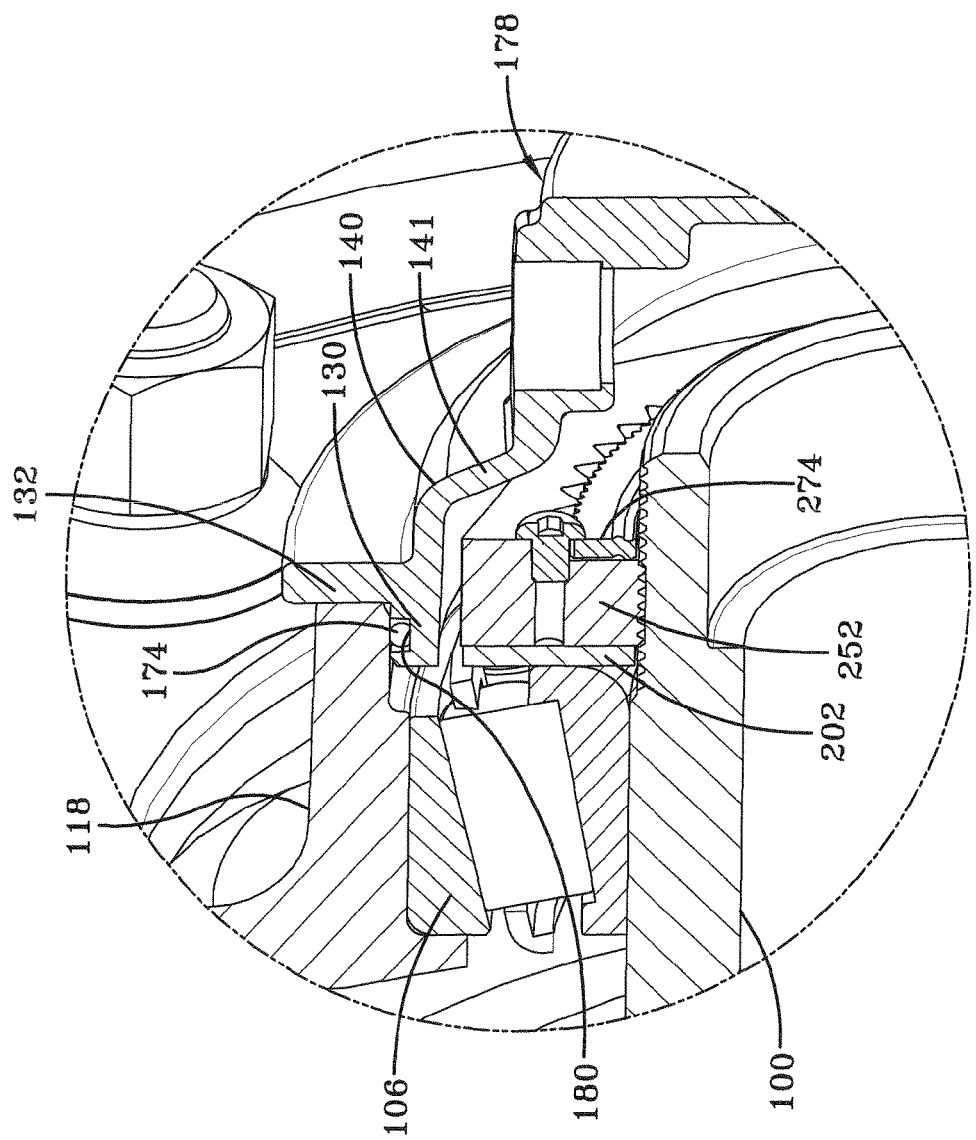
FIG. 6 is a greatly enlarged view of a portion of the axle spindle, wheel end assembly and hubcap shown in the circled area of FIG. 5, and in particular shows the location of an O-ring relative to a hub of the wheel end assembly and the hubcap.

Turning now to FIGS. 5 and 6, a second embodiment hubcap is indicated generally at 178. Second embodiment hubcap 178 is similar to first embodiment hubcap 120, with the only difference being the disposition of O-ring 174 in a channel 180 formed in hubcap lip 130, rather than in wheel hub channel 176 (FIG. 4). Second embodiment hubcap 178 enables O-ring 174 to be mounted on the hubcap, thereby forming an integral unit, which provides easier assembly of the hubcap onto hub 118 in some applications.

Preferably, O-ring 174 is preassembled in hub channel 176 of wheel hub 118 for first embodiment hubcap 120, and is preassembled in hubcap channel 180 for second embodiment hubcap 178. However, due to the elastomeric nature of O-ring 174, the use of the O-ring finds particular advantage in situations in which such preassembly has not been completed, or in which the O-ring needs to be replaced, once other components have been installed. For example, O-ring 174 may be stretched over other components, such as components of tire inflation system 200 (FIG. 7), and placed in hub channel 176 of wheel hub 118 for first embodiment hubcap 120, or placed in hubcap channel 180 of second embodiment hubcap 178, when the O-ring must be installed immediately before the hubcap is attached to the wheel hub, or when the O-ring needs to be replaced during assembly.

In this manner, hubcap 120, 178 of the present invention provides improved sealing engagement with hub 118 by using O-ring 174, as well as lip 130 and shoulder 132, which enable convenient alignment with the hub. Hubcap 120, 178 also readily and accurately accommodates an odometer, a trammel bar and a wheel extender without disturbing the sealing connection between the hubcap and hub 118, by employing threaded cylindrical structure 133 and opening 134 formed in hubcap outboard wall 136.

In addition, opening 138 and boss structure 139 formed in sidewall 140 of hubcap 120, 178 facilitates the mounting of components of a tire inflation system. Moreover, since sidewall opening 138 is separate from cylindrical structure 133 and outboard wall opening 134, tire inflation system components may be mounted on hubcap 120, 178 using the sidewall opening, while another auxiliary device is simultaneously mounted on the hubcap using the cylindrical structure and outboard wall opening. Also, hubcap 120, 178 includes step 141 formed in sidewall 140, which improves impact resistance of the hubcap and enables the hubcap to be mounted with three bolts rather than six, thereby desirably reducing the weight and cost of the hubcap and hub 118, since the number of bosses formed in the hub to receive the bolts may also be reduced. Step 141 also enables tire inflation system components to be mounted on hubcap 120, 178 radially inwardly of the inner diameter of a wheel, thereby reducing the potential damage to the tire inflation system when the wheel is removed.

It is to be understood that hubcap 120, 178 of the present invention preferably is formed as an integral unit by means known in the art, such as casting, molding, fabricating, and the like. Alternatively, depending on design and/or manufacturing considerations, certain components of hubcap 120, 178 may be separately formed, but comprise an integral unit when assembled. In addition, hubcap 120, 178 may be formed without one or more of step 141, sidewall opening 138, cylindrical structure 133 and outboard wall opening 134 without affecting the overall concept or operation of the invention. Moreover, sealing means other than an O-ring that are known in the art may be used to provide a structure to seal the connection between hubcap 120, 178 and hub 118 without affecting the overall concept or operation of the invention, such as a quad ring, a square-cut O-ring, or a sealant filler, such as a silicone material or putty-type material.

Figure 8:
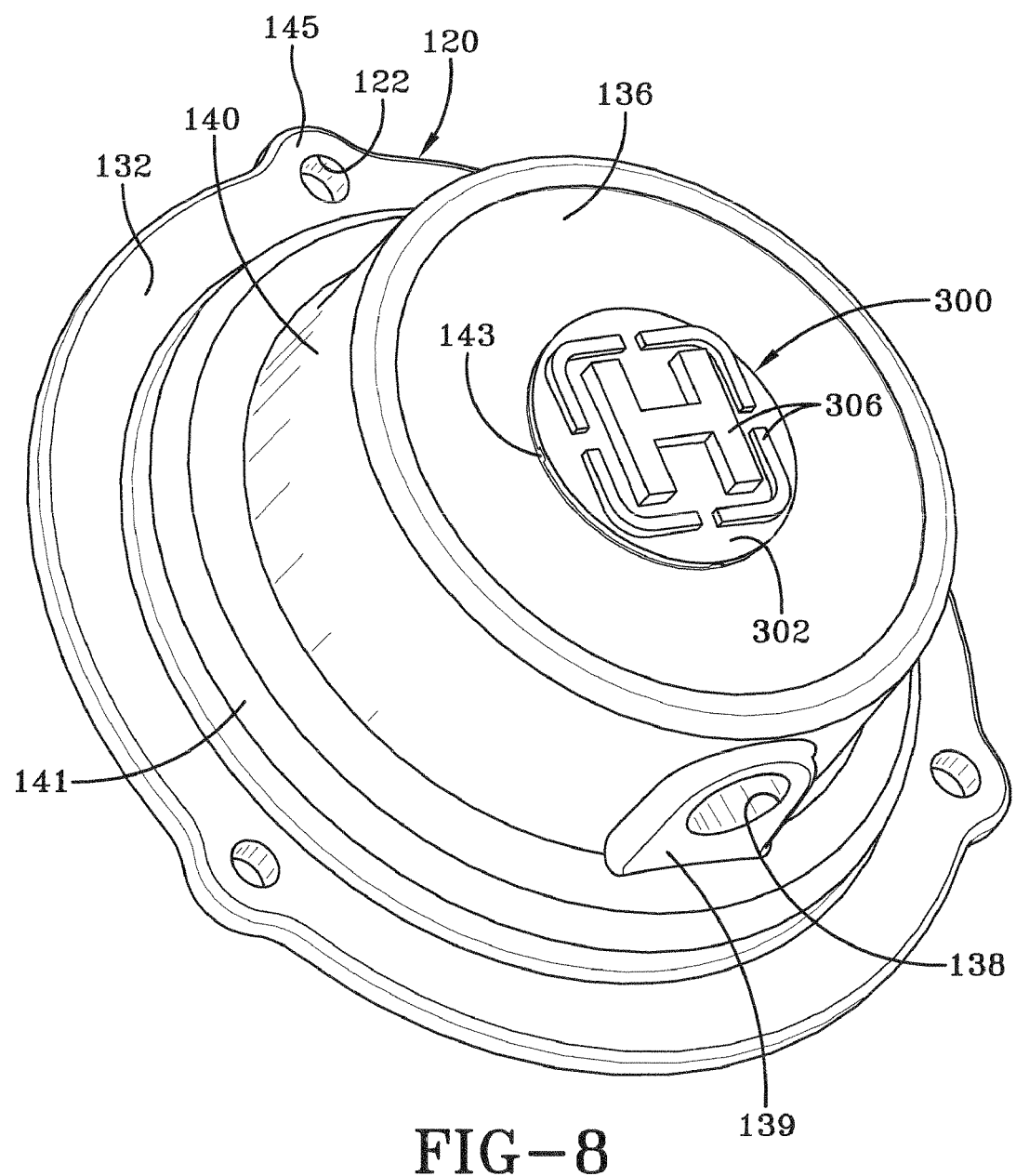
FIG. 8 is an enlarged perspective view of the exterior portion of the hubcap shown in FIG. 2, with a first embodiment of an end plug installed on the hubcap.
Figure 9:
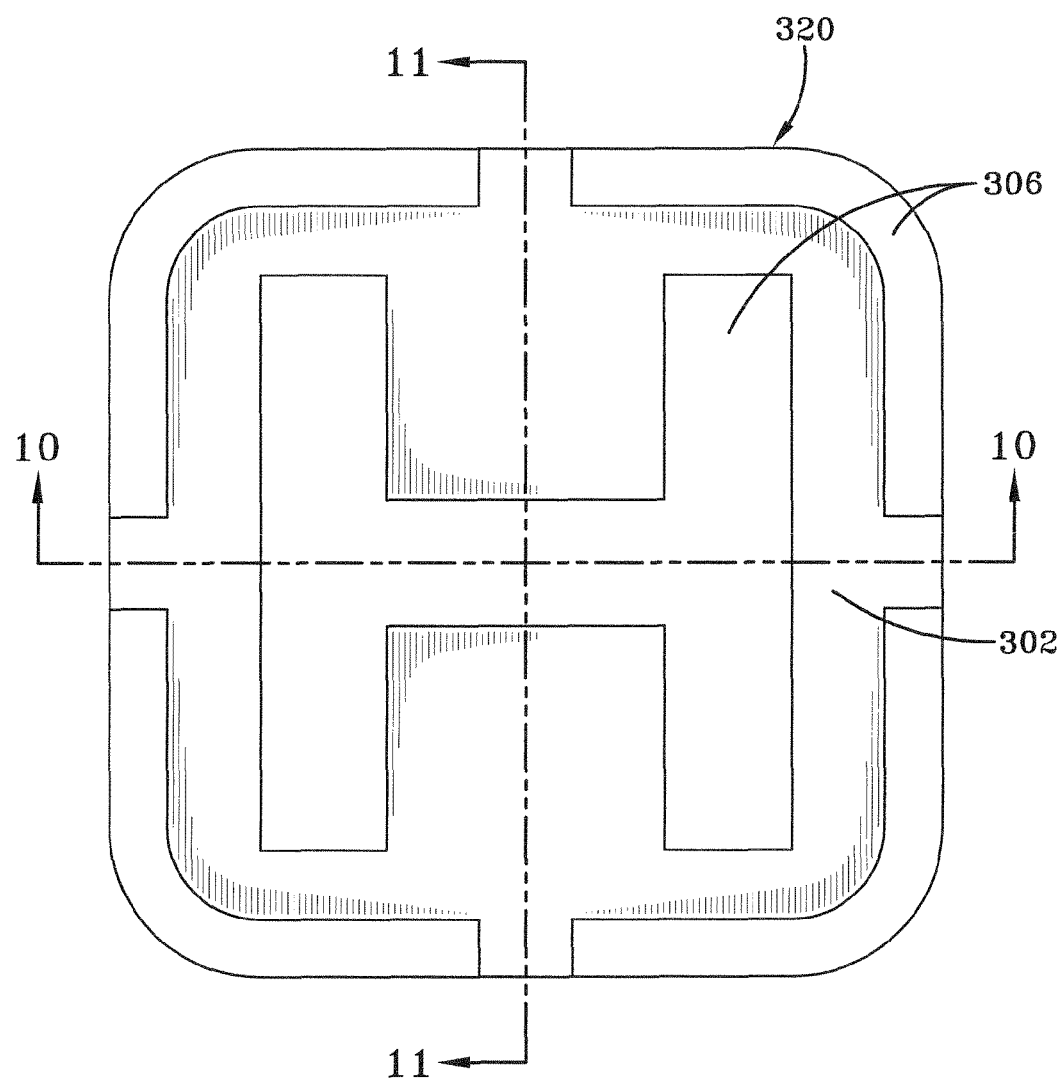
FIG. 9 is a top plan view of a second embodiment of an end plug for installation on the hubcap of the present invention.
Figure 10:
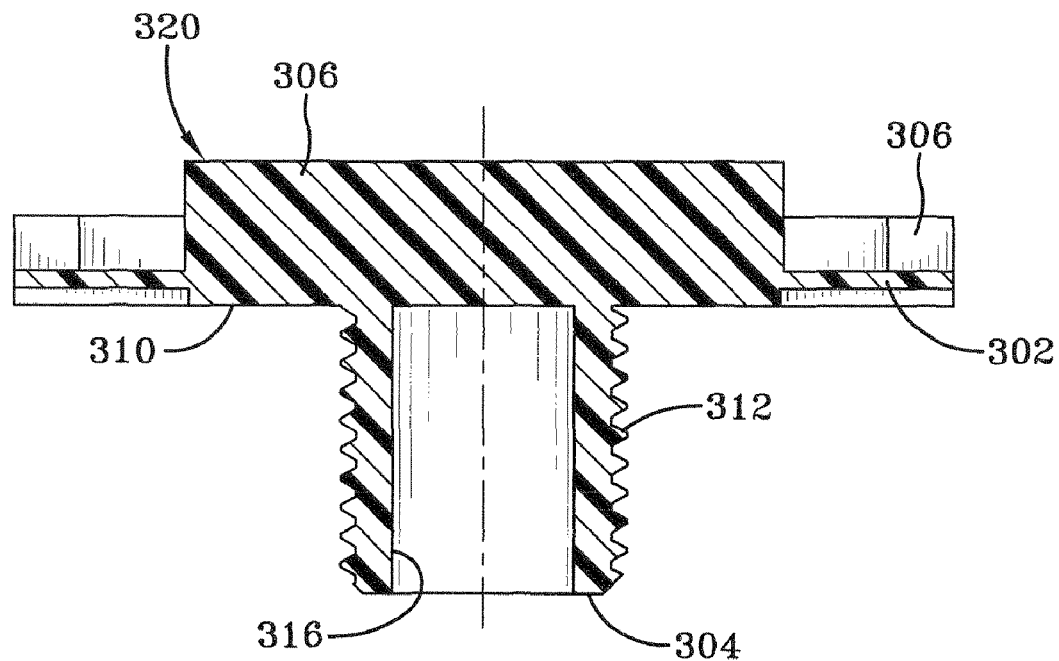
FIG. 10 is a cross-sectional view of the end plug shown in FIG. 9, taken along line 10-10.
Figure 11:
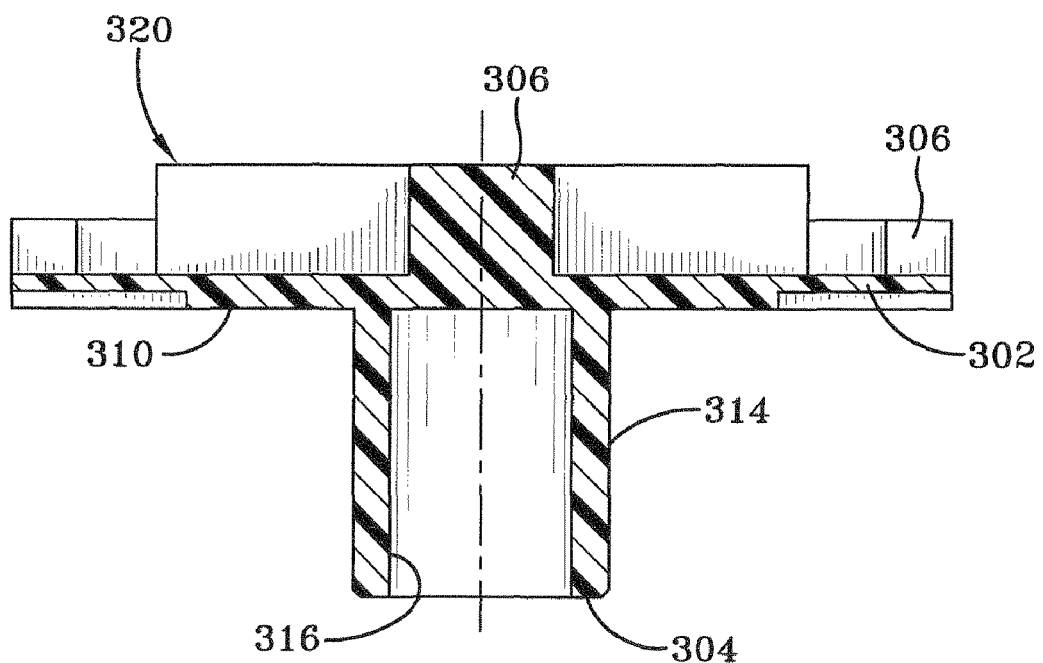
FIG. 11 is a cross-sectional view of the end plug shown in FIG. 9, taken along line 11-11.

Turning now to FIGS. 8-11, two embodiments of an end plug that may optionally be installed on hubcap 120, 178 of the present invention are shown. A first embodiment plug is indicated generally at 300 and is shown in FIG. 8, and a second embodiment plug is indicated generally at 320 and is shown in FIGS. 9-11. The differences between first embodiment plug 300 and second embodiment plug 320 will be described in detail below. It is to be understood that, while reference below is made to first embodiment hubcap 120 for the purpose of convenience, each one of first embodiment plug 300 and second embodiment plug 320 may be used on the first embodiment hubcap and on second embodiment hubcap 178.

With particular reference first to FIG. 8, first embodiment plug 300 is shown installed on first embodiment hubcap 120 by way of example. First embodiment plug 300 includes a main plate 302, which abuts outboard wall 136 of hubcap 120, covering and protecting recessed surface 143, and extending outboardly from the hubcap. Main plate 302 preferably is formed with surface features 306, which provide a structure that enables a user to grasp plug 300 for installation and removal from hubcap 120, as will be described in greater detail below. Surface features 306 may extend across the outboard surface of main plate 302 generally inside the outer perimeter of the main plate, as shown in FIG. 8, and may also extend along the outer perimeter of the main plate, as shown in second embodiment plug 320 (FIG. 9). Surface features 306 on main plate 302 may also be formed in a manner or design that enables the convenient and generally prominent display of indicia, such as an identifier, logo or other information on plug 300.

With reference now to FIGS. 9-11, second embodiment plug 320 is shown, illustrating additional aspects of the construction and arrangement of the end plug. It is to be noted that first embodiment plug 300 and second embodiment plug 320 are similar in structure and function, with the differences being the shape of main plate 302, which is circular in the first embodiment plug and generally square in the second embodiment plug, and the location of surface features 306, which are disposed inside the outer perimeter of the main plate as in the first embodiment plug, but are also disposed along the outer perimeter of the main plate in the second embodiment plug. All other aspects of the construction of first embodiment plug 300 and second embodiment plug 320 are the same, and will be described with reference now to the second embodiment plug.

With particular reference to FIGS. 10 and 11, extending inboardly from an inboard surface 310 of main plate 302, and in axial alignment with the main plate, is a trunk 304. Trunk 304 enables plug 320 to be attached to hubcap 120 (FIG. 8). More particularly, trunk 304 is sized and cylindrically-shaped to engage cylindrical opening 134 formed in cylindrical structure 133 of hubcap 120 (FIG. 2). Specifically, threads 312 are formed on trunk 304 and threadably engage mating threads 135 formed in cylindrical structure 133. Preferably, threads 312 are formed about a portion of the circumference of trunk 304, so that the trunk includes a smooth wall 314 as shown in FIG. 11. This partial formation of threads 312 about trunk 304 causes the trunk to be self-tapping, which enables plug 320 to clean out any dirt or debris that may have accumulated on threads 135 in cylindrical structure 133 when the plug is installed on hubcap 120. In addition, trunk 304 is formed with a cavity 316, which enables plug 320 to be lighter in weight and to also receive dirt and debris that may be worked loose when plug threads 312 engage cylindrical structure threads 135, thereby enabling the plug to be completely threaded into cylindrical structure 133, that is, until main plate inboard surface 310 securely abuts hubcap outboard wall 136.

With general reference to FIGS. 2, and 8-11, a user is able to grasp main plate surface features 306 and easily thread trunk 304 into opening 134 of cylindrical structure 133 to install plug 320 onto hubcap 120, and also to remove the plug from the hubcap. To facilitate such installation and removal, plug 300, 320 preferably is formed of an elastomeric material, but may be formed of other soft materials, such as soft polymers, or more rigid materials depending on design considerations, such as rigid polymers, metals or composites.

Once trunk 304 of plug 300, 320 is threaded into cylindrical structure 133 of hubcap 120 so that main plate inboard surface 310 abuts hubcap outboard wall 136, plug main plate 302 protects recessed surface 143 of the hubcap. Plug 300, 320 thus keeps threads 135 of cylindrical structure 133 clean, which is important for the proper attachment of the above-described devices to the cylindrical structure for the measurement of axle alignment. More particularly, since cylindrical structure 133 is in axial alignment with the centerline of axle 100 due to the construction of hubcap 120, 178, as described above, it is important to ensure that threads 135 of cylindrical structure 133 remain clean, since the accumulation of dirt or debris on the threads may cause a device that is threaded into cylindrical structure 133 for measurement of axial alignment to become misaligned and potentially yield imprecise readings. By installing plug 300, 320 during vehicle operation, any dirt and debris is cleaned off of cylindrical structure threads 135, and additional dirt and debris is prevented from accumulating in cylindrical structure 133. Thus, when the axle alignment is to be measured, plug 300, 320 can be easily removed by a user, and cylindrical structure threads 135 are clean, enabling easy and proper installation of devices for the measurement of axle alignment. Surface features 306 formed on plug 300, 320 also enable convenient display of indicia, such as a logo for prominent brand identification, or other information.

Figure 12:
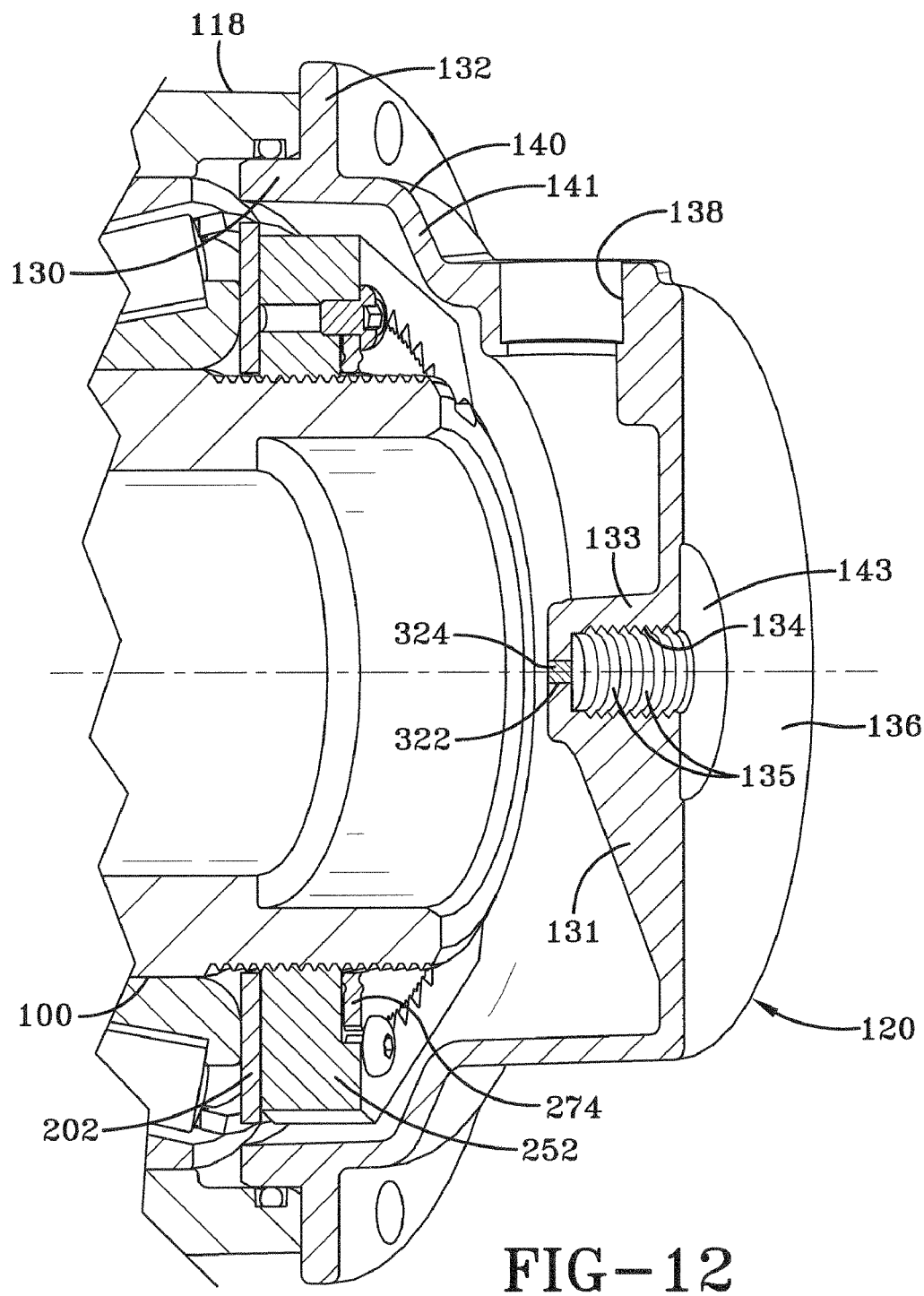
FIG. 12 is a greatly enlarged, fragmentary view of a portion of the axle spindle, wheel end assembly and hubcap shown in FIG. 2, and in particular shows an optional pressure port in the hubcap.

In addition, when a vented axle is used, cylindrical structure 133 may be formed with a pressure port 322, as shown in FIG. 12. In such a situation, a porous plug 324 typically is inserted into pressure port 322 in order to prevent dirt or contaminants from entering the axle through cylindrical structure 133. In order to provide additional protection, plug 300, 320 may be installed in cylindrical structure 133 to prevent dirt and contaminants from entering the cylindrical structure. To maintain proper axle venting, a channel or passage, such as smooth wall portion 314 of trunk 304, may be formed in plug 300, 320, and may extend from trunk cavity 316 to or through main plate 302. In order to prevent the entry of road splash or contaminants, the channel may include a curved or a labyrinth-type configuration.

The present invention also includes a method for providing a hubcap that seals the outboard end of a wheel hub using an O-ring, includes a lip and a shoulder for positive axial alignment of the hubcap with an axle spindle, resists damage from impacts, accommodates an odometer, wheel extender, trammel bar, or protective plug, provides a means for more convenient mounting of tire inflation system components, and enables tire inflation system components to be mounted in a manner that allows a wheel to be easily removed. The method includes steps in accordance with the description that is presented above and shown in FIGS. 2-11.

It is understood that the present invention finds application in all types of heavy-duty wheel end assemblies known to those skilled in the art, including other types of wheel end assemblies than those shown and described herein and known to those skilled in the art, without affecting the concept or operation of the invention. In addition, the present invention has been described with reference to specific embodiments, and it is understood that this description and illustration is by way of example and not by way of limitation. Potential modifications and alterations will occur to others upon a reading and understanding of this disclosure, and it is understood that the invention includes all such modifications and alterations and equivalents thereof.

Accordingly, the hubcap for a heavy-duty vehicle of the present invention is simplified, provides an effective, safe, inexpensive, and efficient structure which achieves all the enumerated objectives, provides for eliminating difficulties encountered with prior art hubcaps, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved hubcap for heavy-duty vehicles is constructed, arranged and used, the characteristics of the construction and arrangement, and the advantageous, new and useful results obtained; the new and useful steps, structures, devices, elements, arrangements, parts and combinations, are set forth in the appended claims.

What is claimed is:

1. A hubcap for a wheel end assembly of a heavy-duty vehicle, said wheel end assembly including a wheel hub formed with a cavity for containing lubricant and having an outboard end, said hubcap comprising:
   a generally cylindrical sidewall extending generally parallel to an axial centerline of said wheel end assembly when said hubcap is mounted on said wheel hub;
   an outboard wall extending generally perpendicular to said sidewall;
   a lip extending inboardly from said sidewall;
   a shoulder extending radially outwardly from said sidewall;
   an opening formed through said sidewall, at least an interior surface of said sidewall being formed with a boss structure proximate said opening for mounting components of a tire inflation system, said boss structure including a generally flat interior surface; and
   seal means disposed generally between said lip and said wheel hub, whereby said lip and said shoulder cooperate to positively engage said wheel hub outboard end and said seal means seals said engagement.

2. The hubcap for a wheel end assembly of a heavy-duty vehicle of claim 1, wherein said seal means includes an O-ring.

3. The hubcap for a wheel end assembly of a heavy-duty vehicle of claim 2, wherein said hub is formed with a channel for receiving said O-ring.

4. The hubcap for a wheel end assembly of a heavy-duty vehicle of claim 2, wherein said lip of said hubcap is formed with a channel for receiving said O-ring.

5. The hubcap for a wheel end assembly of a heavy-duty vehicle of claim 1, wherein a step is formed in said sidewall, and the diameter of said hubcap at its outboard end is less than the diameter of the hubcap at its inboard end.

6. The hubcap for a wheel end assembly of a heavy-duty vehicle of claim 5, wherein said opening formed through said sidewall is proximate said hubcap reduced diameter end, whereby a radial clearance is provided between the inner diameter of a wheel and said tire inflation system components.

7. The hubcap for a wheel end assembly of a heavy-duty vehicle of claim 1, wherein said outboard wall is formed with an inboardly-extending cylindrical structure having an opening that is aligned with a central axis of an axle spindle end.

8. The hubcap for a wheel end assembly of a heavy-duty vehicle of claim 7, wherein an inner wall of said cylindrical structure is formed with threads.

9. The hubcap for a wheel end assembly of a heavy-duty vehicle of claim 7, further comprising a plurality of spaced ribs extending radially from said cylindrical structure to an inner surface of said hubcap sidewall.

10. The hubcap for a wheel end assembly of a heavy-duty vehicle of claim 1, wherein said hubcap is secured to said outboard end of said wheel hub by three bolts.

11. A hubcap for a wheel end assembly of a heavy-duty vehicle, said wheel end assembly including a wheel hub formed with a cavity for containing lubricant and having an outboard end, said hubcap comprising:

a generally cylindrical sidewall extending generally parallel to an axial centerline of said wheel end assembly when said hubcap is mounted on said wheel hub;

an outboard wall extending generally perpendicular to said sidewall, said outboard wall being formed with an opening;

a cylindrical structure extending inboardly from an inboard surface of said outboard wall, said cylindrical structure including a wall with an inner cylindrical surface and an outer cylindrical surface, the cylindrical structure being formed with an opening that is generally aligned with said outboard wall opening and which terminates at a generally closed inboard end of said cylindrical structure;

a lip extending inboardly from said sidewall;

a shoulder extending radially outwardly from said sidewall; and seal means disposed generally between said lip and said wheel hub, whereby the lip and said shoulder cooperate to positively engage said wheel hub outboard end and said seal means seals said engagement, and said lip and the shoulder further cooperate with the wheel hub outboard end to align said outboard wall opening and said cylindrical structure opening with a central axis of an axle spindle end.

12. The hubcap for a wheel end assembly of a heavy-duty vehicle of claim 11, wherein said seal means includes an O-ring.

13. The hubcap for a wheel end assembly of a heavy-duty vehicle of claim 12, wherein said hub is formed with a channel for receiving said O-ring.

14. The hubcap for a wheel end assembly of a heavy-duty vehicle of claim 12, wherein said lip of said hubcap is formed with a channel for receiving said O-ring.

15. The hubcap for a wheel end assembly of a heavy-duty vehicle of claim 11, wherein a step is formed in said sidewall, and the diameter of said hubcap at its outboard end is less than the diameter of the hubcap at its inboard end.

16. The hubcap for a wheel end assembly of a heavy-duty vehicle of claim 11, wherein said inner cylindrical surface of said cylindrical structure wall is formed with threads.

17. The hubcap for a wheel end assembly of a heavy-duty vehicle of claim 16, wherein auxiliary components selectively engage said threads to selectively mount said auxiliary components on said hubcap.

18. The hubcap for a wheel end assembly of a heavy-duty vehicle of claim 11, further comprising a plurality of spaced ribs extending radially from said cylindrical structure to an inner surface of said hubcap sidewall.

19. The hubcap for a wheel end assembly of a heavy-duty vehicle of claim 11, wherein said hubcap is secured to said outboard end of said wheel hub by three bolts.

20. The hubcap for a wheel end assembly of a heavy-duty vehicle of claim 11, wherein said cylindrical structure selectively receives an end plug.

21. The hubcap for a wheel end assembly of a heavy-duty vehicle of claim 20, wherein said inner cylindrical surface of said cylindrical structure wall is formed with threads, and said plug is formed with threads for threadably engaging said inner cylindrical surface threads.

22. The hubcap for a wheel end assembly of a heavy-duty vehicle of claim 20, wherein said plug is formed with surface features.

23. The hubcap for a wheel end assembly of a heavy-duty vehicle of claim 22, whereby said surface features enable a user to grasp said plug for at least one of installation and removal of the plug from said hubcap.

24. The hubcap for a wheel end assembly of a heavy-duty vehicle of claim 22, wherein said surface features are formed to display indicia.

25. The hubcap for a wheel end assembly of a heavy-duty vehicle of claim 11, wherein said cylindrical structure is formed with a pressure port, and a porous plug is disposed in said pressure port.

26. The hubcap for a wheel end assembly of a heavy-duty vehicle of claim 25, wherein said cylindrical structure selectively receives an end plug, said end plug being formed with a vent passage.

27. The hubcap for a wheel end assembly of a heavy-duty vehicle of claim 11, wherein said lip is concentric with said sidewall and with said cylindrical structure, providing said alignment of said outboard wall opening and said cylindrical structure opening with said axle spindle end central axis.

* * * * *